United States Patent Office 3,737,544
Patented June 5, 1973

3,737,544
COMPOSITIONS AND METHODS UTILIZING 2,5-DI-METHYL - 1,3,4,9b-TETRAHYDO - 2H - INDENO [1,2-c]PYRIDINE
Ernst Jucker, Ettingen, Anton Ebnother, Arlesheim, and Jean-Michel Bastian, Birsfelden, Switzerland, assignors to Sandoz Ltd. (also known as Sandoz AG), Basel, Switzerland
No Drawing. Original application May 13, 1969, Ser. No. 824,274, now Patent No. 3,574,686. Divided and this application Dec. 9, 1970, Ser. No. 96,642
Int. Cl. A61n 27/00
U.S. Cl. 424—263   5 Claims

ABSTRACT OF THE DISCLOSURE

The invention concerns 2,5 - dimethyl - 1,3,4,9b - tetrahydro-2H-indeno[1,2c]pyridine of the formula:

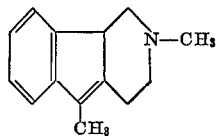

and acid addition salts thereof. Processes for the production of the above compounds are also described.

The compounds are useful sedative-neuroleptics.

---

This application is a division of Ser. No. 824,274, filed May 13, 1969, now U.S. Pat. 3,574,686.

The present invention concerns 2,5-dimethyl-1,3,4,9b-tetrahydro-2H-indeno[1,2-c]pyridine of Formula I,

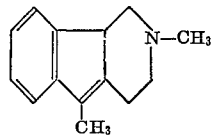  (I)

and acid addition salts thereof.

The compound of Formula I and its salts may be produced by (a) removing water from 2,5-dimethyl-5-hydroxy - 1,2,3,4,4a,9b - hexahydro - 5H - indeno[1,2-c] pyridine of Formula II,

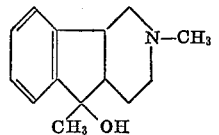  (II)

or (b) treating 1-phenyl-1-(4-hydroxy-1-methylpiperidyl-4)ethan-1-ol of Formula III,

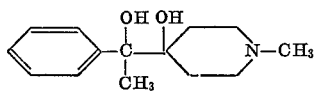  (III)

1-phenyl-1-(1 - methyl - 1,2,3,6 - tetrahydropyridyl - 4) ethan-1-ol of Formula IV,

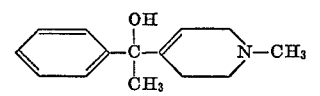  (IV)

or 1 - phenyl - 1 - (1 - methyl - 1,2,3,6 - tetrahydropyridyl-4)ethene of Formula V

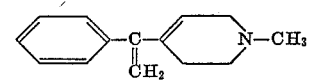  (V)

with a strong acid, and optionally reacting the resulting compound with an inorganic or organic acid.

Process (a) may, for example, be effected as follows: The removal of water is effected by treating 2,5-dimethyl-5-hydroxy-1,2,3,4,4a,9b-hexahydro - 5H - indeno[1,2-c] pyridine, as free base or as acid addition salt, with water-removing agents at a temperature ranging from room temperature to the boiling temperature of the reaction mixture for about ½ to 24 hours. The reaction mixture is subsequently evaporated to dryness and the resulting acid addition salt of the compound of Formula I is optionally purified in manner known per se, e.g. by crystallization from suitable solvents, e.g. lower alcohols such as isopropanol.

A strong acid is preferably used for the removal of water. Examples of suitable acids are mineral acids (e.g. in aqueous or alcoholic solution), such as hydrochloric, hydrobromic, hydriodic, sulphuric, phosphoric acid, or strong organic acids, e.g. organic sulphonic acids, such as methanesulphonic, benzenesulphonic, naphthalene-1,5-disulphonic acid.

An acid chloride of a strong acid, such as thionyl chloride or methanesulphonic acid chloride, or an acid anhydride, such as acetic anhydride, as well as other reagents suitable for the removal of water, such as phosphorus pentoxide, may likewise be used as water-removing agents. The compound of Formula II is conveniently heated to the boil under reflux for about 10 to 45 minutes with a 4 to 6 N solution of hydrogen chloride in a lower alkanol, e.g. ethanol, and the reaction mixture is subsequently evaporated to dryness; whereby 2,5-di-methyl-1,3,4,9b-tetrahydro-2H-indeno[1,2-c]pyridine hydrochloride is obtained as residue.

In accordance with process (b) the compound of Formula I is obtained by treating a compound of Formula III, IV or V with a strong acid, e.g. with an aqueous solution of hydrogen bromide or an aqueous solution of hydrochloric or sulphuric acid, or with methanesulphonic acid. For example, 1-phenyl-1-(1-methyl-1,2,3,6-tetrahydropiperidyl-4-)ethan-1-ol is added to an about 48% aqueous hydrogen bromide solution, the mixture is subsequently stirred at a temperature of 20–70° C. for about 2 hours and is subsequently evaporated to dryness, whereby 2,5 - dimethyl - 1,3,4,9b - tetrahydro - 2H - indeno-[1,2-c]pyridine hydrobromide is obtained as residue. The free base may be obtained by subsequent treatment with an ammonium hydroxide solution.

2-5-dimethyl-1,3,4,9b-tetrahydro - 2H - indeno[1,2 - c] pyridine of Formula I may be isolated and purified in manner known per se as free base or in the form of one of its salts. It is a basic compound which forms stable, generally water-soluble and crystalline salts with inorganic and organic acids.

2,5 - dimethyl-1,3,4,9b-tetrahydro - 2H - indeno[1,2-c] pyridine, and pharmaceutically acceptable acid addition salts thereof, are useful because they possess pharmacological activity in animals. In particular, the compounds are useful sedative-neuroleptic agents as indicated by their properties in potentiating barbiturate narcosis in mice, and in inhibiting amphetamine-induced locomotor activity, also in mice. The neuroleptic activity of the compounds is also illustrated by their properties in inhibiting the so-called conditioned flight reaction (pole jump experiment) in rats.

For the abovementioned use, the dosage administered will of course vary depending upon the compound employed, mode of administration and treatment desired. However, in general, satisfactory results are obtained for all indications at a daily dosage of from about 0.1 milligram to about 100 milligrams per kilogram of animal body weight, preferably given in divided doses 2 to 3 times daily or in retard form. For the larger mammals, a suitable total daily dosage ranges from about 10 to about 600 mg. and unit dosage forms suitable for oral administration comprise from about 3 milligrams to about 300 milligrams of the particular compound admixed with a pharmaceutical carrier.

The new compounds may be used as medicaments on their own or in the form of appropriate medicinal preparations for enteral or parenteral administration. In order to produce suitable medicinal preparations, which are also included in the present invention, the new compounds are worked up with inorganic or organic, pharmacologically inert adjuvants. Examples of such adjuvants are:

for tablets and dragées: lactose, starch, talcum, stearic acid;
for capsules: tartaric acid, lactose;
for injectable solutions: water, alcohols, glycerin, vegetable oils;
for suppositories: natural or hardened oils, waxes.

The preparations may furthermore contain suitable preserving, stabilizing or wetting agents, stabilizers, sweetening or colouring substances and flavourings.

Examples of suitable preparations are tablets or hard gelatin capsules containing 10 to 30 mg. of 2,5-dimethyl-1,3,4,9b-tetrahydro - 2H - indeno[1,2 - c]pyridine hydrochloride.

Tablets may be produced by granulating, for example, about 6 parts of 2,5-dimethyl - 1,3,4,9b - tetrahydro-2H-indeno[1,2-c]pyridine hydrochloride with about 12 parts of tartaric acid, about 2.5 parts of polyvinyl pyrrolidone and about 2.5 parts of talc, about 5 parts of maize starch, about 1 part of stearic acid and about 71 parts of lactose, and pressing the resulting granulate into tablets.

Hard gelatin capsules are produced by mixing, for example, about 1 part of 2,5-dimethyl-1,3,4,9b-tetrahydro-2H - indeno[1,2 - c]pyridine hydrochloride with about 2 parts of tartaric acid and about 36 parts of lactose, and filling the resulting mixture into capsules.

The compounds also possess useful anti-depressant properties as indicated by the compounds' effects in inhibiting conditions of ptosis in rats produced by tetrabenazine. Furthermore, the compounds exhibit useful analgetic properties as indicated in the hot plate test and by their properties in inhibiting the p-benzoquinone syndrome in mice, and the monkey tail test [Roemer, Proceedings of the International Symposium on Pain, Paris, April 1967, in "Pain," Academic Press, New York, London 1968, pp. 165–170]. Said anti-depressant and analgetic indications are also obtained within said daily dose range of 0.1 to 10.0 milligrams per kilogram of animal body weight.

The starting materials for the production of 2,5-dimethyl-1,3,4,9b-tetrahydro-2H-indeno[1,2-c]pyridine may, for example, be obtained as follows:

The Compound II is obtained by reacting 2-methyl-5-oxo-1,2,3,4,4a,9b-hexahydro - 5H - indeno[1,2-c]pyridine of Formula VI

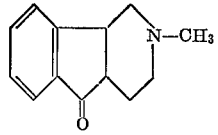

(VI)

in an open-chain or cyclic ether, such as diethyl ether, with methyl lithium, and hydrolyzing the resulting reaction product, e.g. with an aqueous ammonium chloride solution.

The compound of Formula IV is obtained by converting 1-phenyl-1-(pyridyl-4)ethan-1-ol of Formula VII

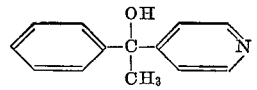

(VII)

into the corresponding N-methyl-pyridinium compound, e.g. by reacting with methyl bromide or methyl iodide, and reducing the N-methyl-pyridinium compound to the compound of Formula IV. This reduction is preferably effected with sodium borohydride in a solvent which is inert under the reaction conditions, e.g. methanol or another alkanol, optionally mixed with water.

The Compound III is obtained by brominating 4-benzoyl-1-methyl-piperidine in the 4 position, e.g. by reacting the hydrobromide with bromine in glacial acetic acid, reacting the resulting 4-benzoyl-4-bromo-1-methyl-piperidine with an alkali metal alcoholate, treating the reaction product with an acid, converting the resulting 4-benzoyl-4-hydroxy-1-methyl-piperidine into 1-phenyl - 1 - (4-hydroxy-1-methylpiperidyl-4)ethan-1-ol by reaction with a methyl magnesium halide in an open-chain or cyclic ether, and then hydrolyzing the resulting reaction product.

The compound of Formula V is produced by removing water from 1-phenyl-1-(1-methyl-1,2,3,6-tetrahydropyridyl-4)ethan-1-ol. This removal of water may be effected by heating with an acid. Acids which may be used are inorganic acids, e.g. hydrochloric acid, and organic acids. The reaction may likewise be effected in a solvent which is inert under the reaction conditions. The resulting compound of Formula V may optionally be converted into its acid addition salts by treating with inorganic or organic acids.

In the following non-limitative examples all temperatures are indicated in degrees centigrade and are uncorrected.

EXAMPLE 1

2,5-dimethyl-1,3,4,9b-tetrahydro-2H-indeno[1,2-c]pyridine

A solution of 14 g. of 2,5-dimethyl-5-hydroxy-1,2,3,4,4a,9b-hexahydro-5H-indeno[1,2-c]pyridine in 200 cc. of a 5 N solution of hydrogen chloride in ethanol is heated to the boil at reflux for 15 minutes. The solution is subsequently evaporated to dryness. After recrystallizing the residue twice from isopropanol pure 2,5-dimethyl-1,3,4,9b - tetrahydro-2H-indeno[1,2-c]pyridine hydrochloride having a M.P. of 203–205° (decomp.) is obtained.

The 2,5-dimethyl-5-hydroxy - 1,2,3,4,4a,9b-hexahydro-5H-indeno[1,2-c]pyridine, used as starting material, may be produced as follows:

100 cc. of a 4.4% solution of methyl lithium in ether is added dropwise at —30° while stirring to a suspension of 32.2 g. of 2-methyl-5-oxo-1,2,3,4,4a,9b-hexahydro-5H-indeno[1,2-c]pyridine in 300 cc' of absolute ether. After the addition is completed the reaction mixture is stirred at —20° for 3 hours, 90 cc. of a 20% ammonium chloride solution are added dropwise while cooling with ice and in an atmosphere of nitrogen, and extraction is effected with ether. The combined ether extracts are dried over magnesium sulphate, the magnesium sulphate is removed by filtration and the filtrate is evaporated to dryness. The residue, a crystalline crude product, is recrystallized twice from diisopropyl ether, whereby pure 2,5-dimethyl-5-hydroxy-1,2,3,4,4a,9b - hexahydro-5H-indeno-[1,2-c]-pyridine, having a M.P. of 132–134°, is obtained.

EXAMPLE 2

2,5-dimethyl-1,3,4,9b-tetrahydro-2H-indeno[1,2-c]pyridine 2.3 g. of 1-phenyl-1-(1-methyl-1,2,3,6-tetrahydropyridyl-4-)ethan-1-ol are added portionwise while stirring to 30 cc. of a 48% aqueous solution of hydrogen bromide. The mixture is stirred at room temperature for 2 hours and is subsequently evaporated to dryness at 60° under reduced pressure. The residue is taken up in a 2 N ammonium hydroxide solution, the liberated base is extracted with benzene and the extracts are dried over magnesium sulphate; the solvent is evaporated and the residue is distilled in a vacuum, whereby 2,5-dimethyl-1,3,4,9b-tetrahydro-2H-indeno[1,2-c]pyridine distils over at 95–100° (temperature measured in the air bath). The hydrochloride has a M.P. of 203–205° (decomp.) after crystallization from isopropanol.

The 1-phenyl-1-(1-methyl-1,2,3,6-tetrahydropyridyl-4)

ethan-1-ol, used as starting material, may be produced as follows:

45 g. of gaseous methyl bromide are passed through a solution of 9.6 g. of 1-phenyl-1-(pyridyl-4)ethan-1-ol in 100 cc. of methanol at a temperature of —10° to 0° while stirring. The reaction mixture is stirred at room temperature overnight and is subsequently evaporated to dryness. The resulting residue is taken up in 350 cc. of methanol and 18.4 g. of sodium borohydride are added portionwise while stirring, whereby the temperature is maintained between 20° and 30° by cooling occasionally. The reaction mixture is stirred at room temperature for 17 hours, is subsequently concentrated by evaporation at 50° and reduced pressure, the residue is taken up in 100 cc. of water and is extracted several times with chloroform. The organic phases are combined, dried over magnesium sulphate and concentrated by evaporation, whereby 1-phenyl-1-(1-methyl-1,2,3,6-tetrahydropyridyl-4)ethan-1-ol is obtained as residue: M.P. 138–140° after crystallization from benzene.

EXAMPLE 3

2,5-dimethyl-1,3,4,9b-tetrahydro-2H-indeno[1,2-c]pyridine

A solution of 50 g. of 1-phenyl-1-(1-methyl-1,2,3,6-tetrahydropyridyl-4)ethan-1-ol in 500 cc. of 20% hydrochloric acid is heated to the boil for 15 hours. The reaction mixture is concentrated by evaporation at 60° and reduced pressure, the residue is taken up in water and potassium carbonate is added to the solution until a strong alkaline reaction is obtained (pH about 10). The liberated base is extracted with ether, the combined ethereal extracts are dried over magnesium sulphate and the solvent is evaporated. The residue is distilled in a bulb tube under reduced pressure, B.P. 130–140°/0.2 mm. of Hg (temperature measured in the air bath). The distillate is dissolved in 30 cc. of isopropanol and the calculated amount of hydrochloric acid in ethanol is added, whereupon after cooling to 0° pure 2,5-dimethyl-1,3,4,9b-tetrahydro-2H-indeno[1,2-c]pyridine hydrochloride, having a M.P. of 197–200° (decomp.), crystallizes.

EXAMPLE 4

2,5-dimethyl-1,3,4,9b-tetrahydro-2H-indeno[1,2-c]pyridine

A solution of 36 g. of 1-phenyl-1-(1-methyl-1,2,3,6-tetrahydropyridyl-4)ethene in 300 cc. of 47% hydrobromic acid is allowed to react at room temperature for 3 hours. The reaction mixture is worked up as described in Example 3, whereby 2,5-dimethyl-1,3,4,9b-tetrahydro-2H-indeno-[1,2-c]pyridine hydrochloride, having a M.P. of 201–203° (decomp.), is obtained.

The 1-phenyl-1-(1-methyl - 1,2,3,6 - tetrahydropyridyl-4)-ethene, used as a starting material, may be produced as follows:

A solution of 54.2 g. of 1-phenyl-1-(-methyl-1,2,3,6-tetrahydropyridyl-4)ethan-1-ol in 300 cc. of 2 N hydrochloric acid is heated to 100° for 1 hour. The reaction mixture is evaporated to dryness under reduced pressure, the residue is taken up in water, and potassium carbonate is added to the solution until a strong alkaline reaction is obtained (pH about 10). After extracting the liberated base with ether and drying the combined ethereal extracts over magnesium sulphate, the solvent is evaporated. The residue is distilled under reduced pressure, whereby pure 1 - phenyl-1-(1-methyl - 1,2,3,6 - tetrahydropyridyl - 4) ethene, having a B.P. of 103–105°/0.008 mm. of Hg is obtained.

The base is converted into the hydrogen maleate by adding a saturated ethereal solution of the calculated amount of maleic acid to an ethereal solution of the base, whereby crystallization sets in spontaneously. After crystallizing the resulting product from acetone/ether 1-phenyl-1-(1-methyl - 1,2,3,6 - tetrahydropyridyl-4)ethene hydrogen maleate, having a M.P. of 95–96.5°, is obtained.

What is claimed is:

1. A pharmaceutical composition for effecting sedation in animals comprising a pharmaceutically acceptable carrier and a sedating effective amount of the compound 2,5-dimethyl-1,3,4,9b-tetrahydro - 2H - indeno[1,2-c]pyridine or a pharmaceutically acceptable acid addition salt thereof.

2. A composition in accordance with claim 1 in which the amount ranges from 10 to 600 milligrams.

3. A composition in accordance with claim 1 in unit dosage form in which the amount of the compound ranges from 3 to 300 milligrams.

4. The method of sedating an animal comprising administering to said animal a selating effective amount of the compound 2,5-dimethyl - 1,3,4,9b - tetrahydro-2H-indeno[1,2-c]pyridine or a pharmaceutically acceptable acid addition salt thereof.

5. The method of claim 4 in which the amount ranges from 10 to 600 milligrams per day.

No references cited.

STANLEY J. FRIEDMAN, Primary Examiner